United States Patent [19]

Raj

[11] Patent Number: 5,908,987
[45] Date of Patent: Jun. 1, 1999

[54] SENSOR EMPLOYING A SLIDING FERROFLUID MASS IN A COATED, NON-WETTING, HOUSING

[75] Inventor: Kuldip Raj, Merrimack, N.H.

[73] Assignee: Ferrofluidics Corporation, Nashua, N.H.

[21] Appl. No.: 08/850,584

[22] Filed: May 2, 1997

Related U.S. Application Data

[63] Continuation-in-part of application No. 08/799,121, Feb. 11, 1997, Pat. No. 5,780,741.

[51] Int. Cl.$^6$ ................................................. G01P 15/08
[52] U.S. Cl. ............................... 73/514.09; 73/514.08; 33/366
[58] Field of Search ........................... 73/514.06, 514.09, 73/514.08, 514.05, 521; 33/366, 372

[56] References Cited

U.S. PATENT DOCUMENTS

| | | | |
|---|---|---|---|
| 3,516,294 | 6/1970 | Schmieder | 73/514.08 |
| 3,839,904 | 10/1974 | Stripling et al. | 73/654 |
| 4,676,103 | 6/1987 | Nakajima | 73/514.08 |
| 4,706,498 | 11/1987 | Nemnich et al. | 73/514.08 |
| 4,843,877 | 7/1989 | Kushida et al. | 73/514.08 |
| 4,922,753 | 5/1990 | Idogaki et al. | 73/514.08 |
| 5,452,520 | 9/1995 | Raj et al. | 33/366 |
| 5,632,093 | 5/1997 | Elias | 33/366 |

FOREIGN PATENT DOCUMENTS

| | | | |
|---|---|---|---|
| 000605180 | 4/1978 | U.S.S.R. | 73/514.08 |

Primary Examiner—Michael Brock
Attorney, Agent, or Firm—Kudirka & Jobse, LLP

[57] ABSTRACT

A ferrofluid sensor assembly includes a closed housing containing a movable inductance core material that is isolated from the inner walls of the housing by an isolating material. The isolating material forms a layer between the inductance core material and the walls of the housing to prevent their contact. A detector also is included for detecting the position of the inductance core material within the housing.

12 Claims, 4 Drawing Sheets

SENSOR EMPLOYING A SLIDING FERROFLUID MASS IN A COATED, NON-WETTING, HOUSING

RELATED APPLICATION

This application is a continuation-in part-application of patent application entitled Ferrofluid Sensor, filed on Feb. 11, 1997, and assigned Ser. No. 08/799,121, now U.S. Pat. No. 5,780,741.

FIELD OF THE INVENTION

This invention relates to a ferrofluid sensor subassembly that can be employed for detection and measurement of vibrations, acceleration and tilt.

BACKGROUND OF THE INVENTION

Sensors, or transducers, may be used to detect and measure a variety of conditions including vibrations, acceleration and tilt. Sensor subassemblies are available in a variety of forms including mechanical, electrical and ferrofluidic. Mechanical vibration and acceleration sensors use pendulums or moving elements. Electrical sensors use mercury slugs or cantilever beams to make or break an electrical contact. In a mercury-based sensor, the mercury is sealed in a glass vessel. Because of a high surface tension, the mercury does not stick to the glass vessel, but responds quickly to slight vibrations. However, mercury has the disadvantage of being a hazardous material.

One type of prior art ferrofluidic sensor subassembly consists of an axially polarized permanent magnet located in a non-magnetic housing completely filled with ferrofluid as illustrated in FIG. 1 and discussed in detail in U.S. Pat. No. 4,667,414. Ferrofluid 1 is a colloidal mixture of magnetic particles suspended in a liquid carrier, such as oil. The particles are coated with a surfactant and are kept in suspension in the carrier liquid. ferrofluid 1 is sealed inside the non-magnetic housing 2, which includes a mechanism that allows the ferrofluid to expand (not shown in FIG. 1). For example, housing 2 may incorporate flexible diaphragms. A magnet 3 is free to move inside housing 2 and is suspended in the housing 2 by the ferrofluid 1, which becomes trapped in the magnetic field produced by the magnet 3.

The movement of magnet 3 can be detected by inductive coils (not shown) wound around housing 2 or by a Hall element (not shown). With the appropriate electronic signal processing, the inclination or acceleration of housing 2 can be measured.

While such a device is relatively simple and works well in many circumstances, the ferrofluid 1 is generally fairly viscous due to the presence of the oil carrier. The viscosity of the ferrofluid 1 consequently produces a viscous drag on the magnet 3 and thus slows response time of the device. Since the ferrofluid viscosity is a function of temperature, the response time is temperature dependent. Furthermore, a small increase in the mass of the magnet 3 occurs over time due to sedimentation of ferrofluid particles on the magnet surface. This affects the calibration of the device.

In order to overcome these problems, the configuration illustrated in FIG. 2 is often used. This configuration is described in detail in U.S. Pat. No. 5,452,520. The magnet 3 in this device is centered in a housing or tube 2 by two ferrofluid rings 1,4 situated on either end of the magnet 3 and held by the magnetic field. There is no physical contact between the magnet 3 and the housing 2. The magnet 3 can slide freely because the ferrofluid rings 1,4 act as frictionless bearings inside the housing 2. The ferrofluid rings 1,4 also form low pressure seals between the magnet 3 and the walls of the housing 2. Accordingly, the ends of the housing 2 generally have small openings 5,6 to release any pressure build-up of air due to the motion of the magnet 3.

This device does not have the response time and calibration problems discussed above. However, as the magnet 3 moves, it leaves behind a thin layer of ferrofluid adhering to the wall of the housing 2 due to surface tension. Eventually, the ferrofluid in the ferrofluid rings 1,4 becomes depleted and the levitation force produced by the ferrofluid is reduced. If the length of the housing 2 is relatively long so that the magnet 3 excursion is long or the magnet 3 movement is rapid, a significant amount of the ferrofluid may be lost from the ferrofluid rings 1,4 during each travel of the magnet 3 through the housing 2, thereby rapidly depleting the ferrofluid rings 1,4. When the rings 1,4 are sufficiently depleted, magnet 3 will no longer be suspended resulting in failure of the device. Additionally, over time, ferrofluid may be lost through the vent holes 5,6 in the housing resulting in a short product life.

It therefore is desirable to reduce the response time of ferrofluid sensors while extending their life.

SUMMARY OF THE INVENTION

A ferrofluid sensor assembly constructed in accordance with the principles of the present invention includes a closed housing containing a movable inductance core material that is isolated from the inner walls of the housing by an isolating material. The isolating material forms a layer between the inductance core material and the walls of the housing to prevent their contact. A detector also is included for detecting the position of the inductance core material within the housing.

Because the housing is sealed, there are no evaporative losses of the ferrofluid. As the magnet moves, there is no residual film of ferrofluid left behind on the surface of the housing because the ferrofluid rides on the thin layer of isolating material and does not wet the surface of the housing walls.

In accordance with one embodiment, the isolating material is a non-magnetic liquid and the inductance core material is a ferrofluid that is immiscible with the non-magnetic liquid. The nonmagnetic liquid wets the walls of the housing and provides a surface such that the ferrofluid rides on the thin layer of the non-magnetic liquid.

DETAILED DESCRIPTION OF PREFERRED EMBODIMENTS

Figure 1:
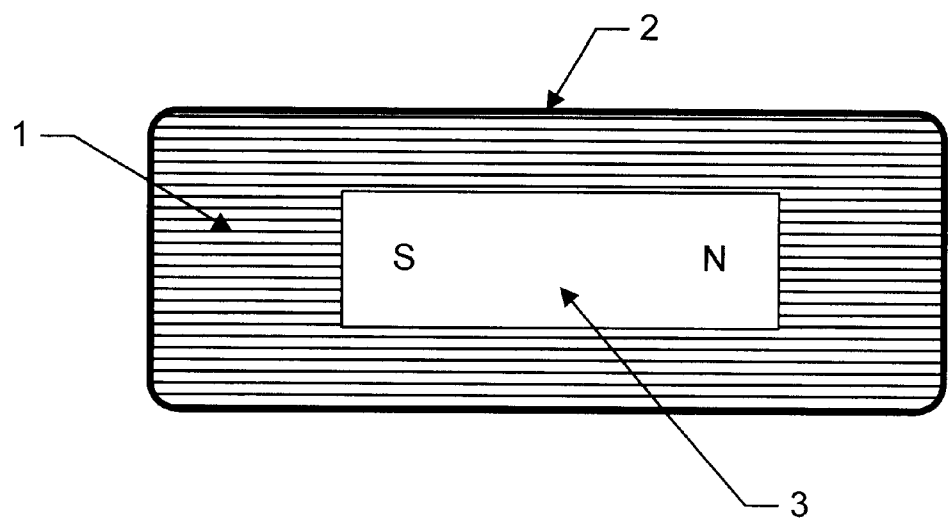
FIG. 1 is a schematic diagram of a prior art ferrofluid sensor subassembly which is completely filled with ferrofluid to suspend a sensor magnet.
Figure 2:
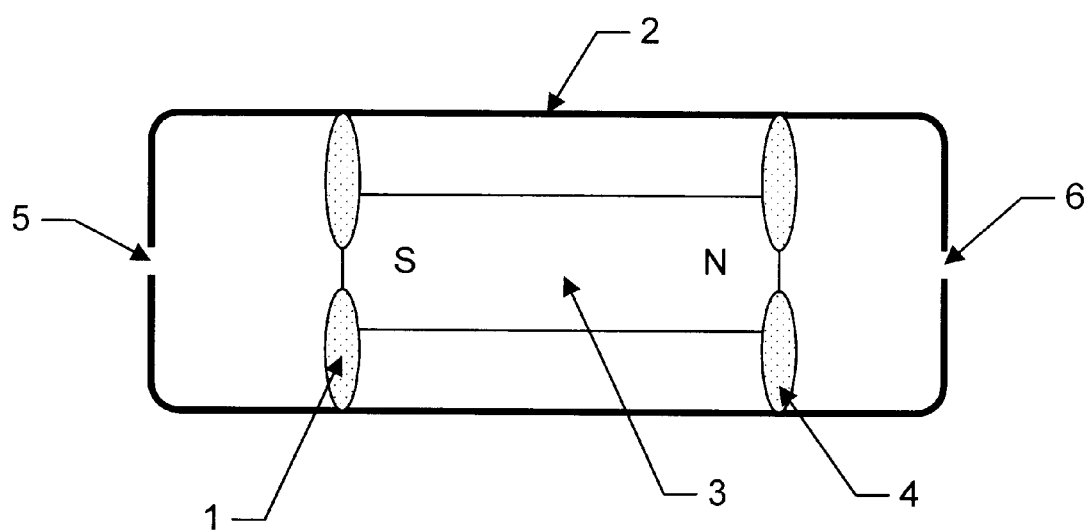
FIG. 2 is a schematic diagram of another prior art ferrofluid sensor subassembly which utilizes ferrofluid rings to suspend the sensor magnet.
Figure 3:
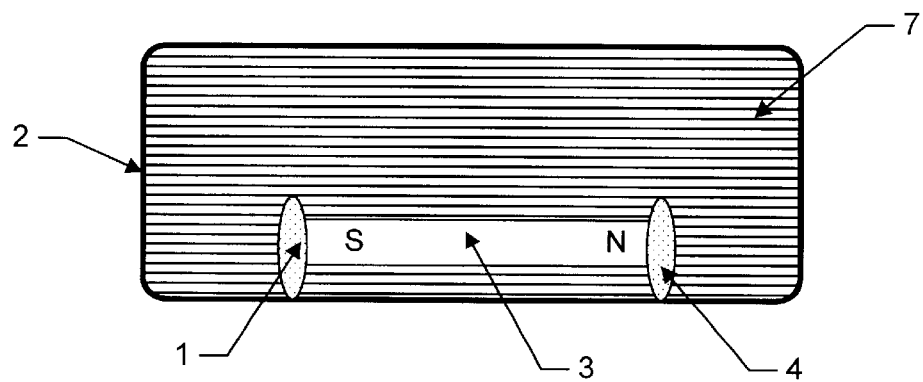
FIG. 3 is a schematic diagram of a ferrofluid sensor subassembly that utilizes ferrofluid rings to suspend the sensor magnet in a low viscosity fluid filled housing.

As shown in FIG. 3, an hermetically-sealed housing 2 encloses a movable inductance core material 3 and an isolating material 7. The movable inductance core 3 may be an axially-polarized permanent magnet, and the isolating material 7 is a nonmagnetic liquid. Magnet 3 is supported in housing 2 by ferrofluid rings 1 and 4 at each end of the magnet and the levitation force produced by the ferrofluid. Rings 1,4 are held in place at the ends of magnet 3 by the magnetic field produced by magnet 3. However, housing 2 is large enough that the ferrofluid rings 1,4 do not seal the ends of magnet 3 against the walls of nonmagnetic housing 2, which may be made of glass or plastic. Therefore, as the magnet 3 moves, the liquid 7 is free to move around the magnet 3.

Housing 2 is filled with the nonmagnetic fluid 7 that is immiscible with the ferrofluid in rings 1 and 4. The ferrofluid carrier liquid neither mixes with, nor chemically reacts with, the ferrofluid in the rings 1 and 4. Thus, the colloid stability and physical properties of ferrofluid remain unchanged when it is in contact with the liquid 7. The non-magnetic liquid 7 preferentially wets the inner walls of the housing 2 such that the ferrofluid in rings 1 and 4, which would otherwise stick to the dry wall of the housing, now ride on the thin layer (film) of the nonmagnetic liquid 7. The thin layer of nonmagnetic liquid 7 may have a minimum thickness of one molecule of the liquid 7. Alternatively, another nonwetting film could be used on the inner walls of the housing. Such a material might, for example, comprise a film of TEFLON® or other suitable coating.

Many types of non-magnetic liquids can be used for liquid 7. Water is the preferred liquid, however, because of its high freezing point (0° C.), it is preferable to mix the water with isopropanol which has a freezing point of about –89.5° C. or any suitable alcohol. The temperature range of the sensor subassembly can thus be extended to lower temperatures. Water is immiscible with a typical oil based ferrofluid carrier liquid. Such a ferrofluid might be based on a low molecular weight fluorocarbon carrier, which is chemically known as perfluoropolyether.

Because the housing 2 is sealed, there are no evaporative losses from the ferrofluid carrier. In addition, as the magnet 3 moves, there is no residual film of ferrofluid left behind on the surface of the housing 1 from the ferrofluid rings 1 and 4. The magnet 3 is permanently suspended by the two ferrofluid rings 1 and 4 and there is no degradation with time.

Figure 4:
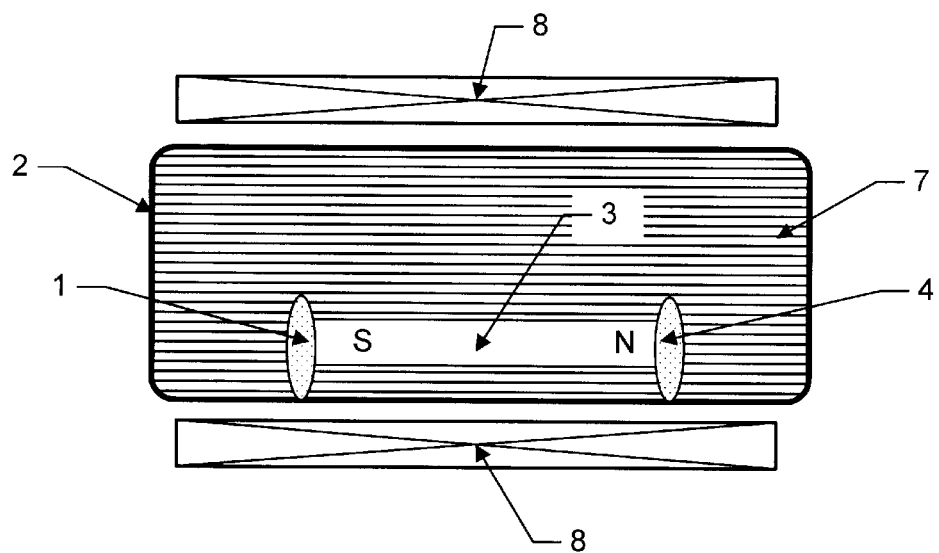
FIG. 4 is a schematic diagram of the ferrofluid sensor subassembly of FIG. 3 having inductive coils.

FIG. 4 illustrates a mechanism for sensing the position of the sensor magnet 3. The ferrofluid sensor assembly is constructed in the same manner as shown in FIG. 3 and includes a permanent magnet 3, which is supported in a hermetically-sealed housing 2 by ferrofluid rings 1 and 4 at each end of the magnet 3. The housing 2 is filled with a non-magnetic liquid 7 that is immiscible with the ferrofluid in rings 1 and 4. FIG. 4 illustrates inductive coils 8 positioned around the housing 2 which sense the position of the sensor magnet 3. The position of the magnet 3 in the sensor subassembly influences the inductance of coil 8 thereby generating an electrical signal which depends on the position of the magnet 3. Conventional electronic processing of this signal yields information about the vibrational level or inclination of the housing 2.

Figure 5:
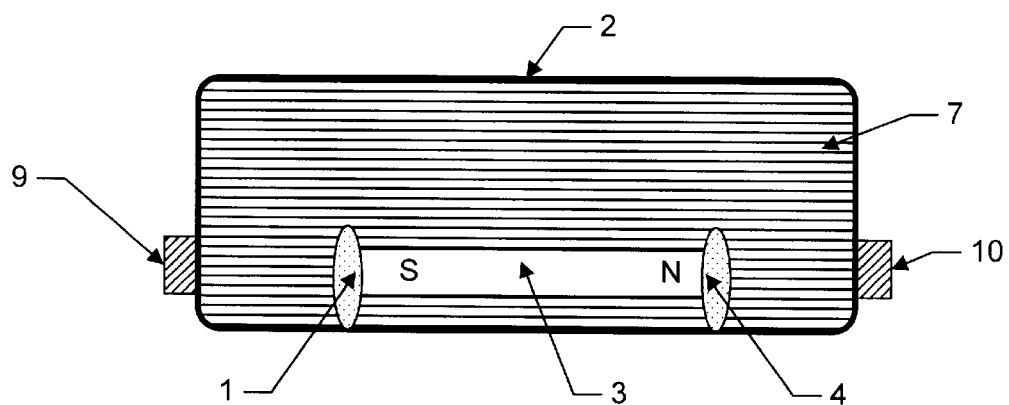
FIG. 5 is a schematic diagram of the ferrofluid sensor subassembly of FIG. 3 having Hall-effect devices.

FIG. 5 illustrates the assembly in which the position of sensor magnet 3 is sensed by Hall-effect elements 9 and 10. These operate in a conventional manner to detect changes in the magnetic field generated by magnet 3 and thereby determine its position.

An actual subassembly was tested using a glass tube as housing 2 with a length of 40 mm, an outer diameter of 8 mm and an inner diameter of 6 mm. The housing tube 2 was closed at one end. The nonmagnetic liquid 7 was a 50/50 by volume mixture of deionized water and isopropanol. Magnet 3 consisted of an axially-polarized cylindrical Alnico 5 magnet with a length of 11 mm and a diameter of 2.5 mm. The ferrofluid in rings 1 and 4 comprised a fluorocarbon-based ferrofluid with a magnetization of 325 gauss, and a viscosity less than 5 cp at 27° C.

The housing tube 2 was first rinsed with the 50/50 water isopropanol mixture 7 two times and then it was filled with the 50/50 water isopropanol mixture 7. The magnet 3 was cleaned with the mixture 7. The magnet 3 was cleaned with heptane and isopropanol to remove impurities and then placed inside the tube 2. About 25 microliters of ferrofluid was added to each pole of the magnet with a microdispenser. The open end of the tube 2 was then sealed with a plug. A small air bubble was, however, left inside the tube 2 to allow for expansion of the mixture 7.

The aforementioned assembly was tested over a period of six months to determine if the ferrofluid colloid stability was affected by the immiscible mixture 7. The assembly was also monitored to determine if the ferrofluid and the mixture 7 intermixed over time. Further examinations were conducted to ascertain if the movement of the magnet left a thin film of ferrofluid on the wall of the tube. None of these problems were, however, found to occur in the assembly. The magnet was responsive to the vibrations at the end of the test period just the same way as it was on the first day of the test period.

This aforementioned assembly was also tested as a vibration sensor replacing a mercury-based sensor and was found to be a suitable replacement. The magnet in the assembly provides a high conductivity similar to the high conductivity of mercury and the levitation of the magnet on the ferrofluid rings in the presence of the low viscosity immiscible liquid provides a magnet movement similar to the low-friction movement of the mercury slug.

Figure 6:
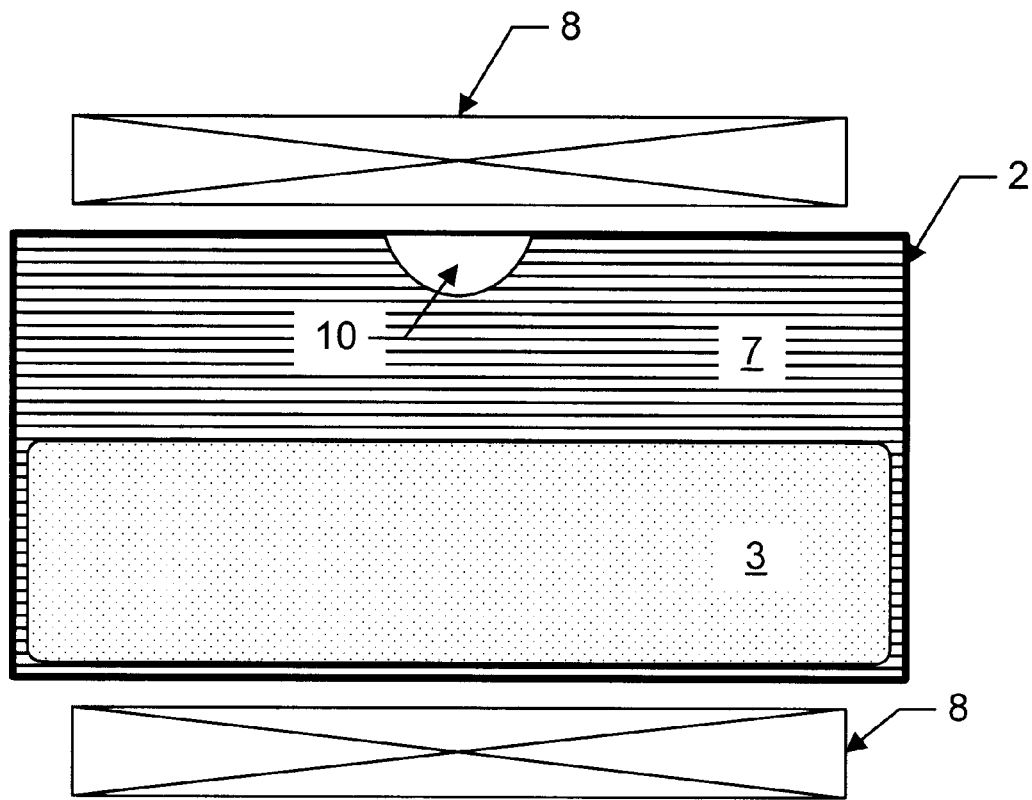
FIG. 6 is a schematic diagram of a ferrofluid sensor subassembly having a ferrofluid acting as the sole inductance core material, and a single inductance coil.
Figure 7A:
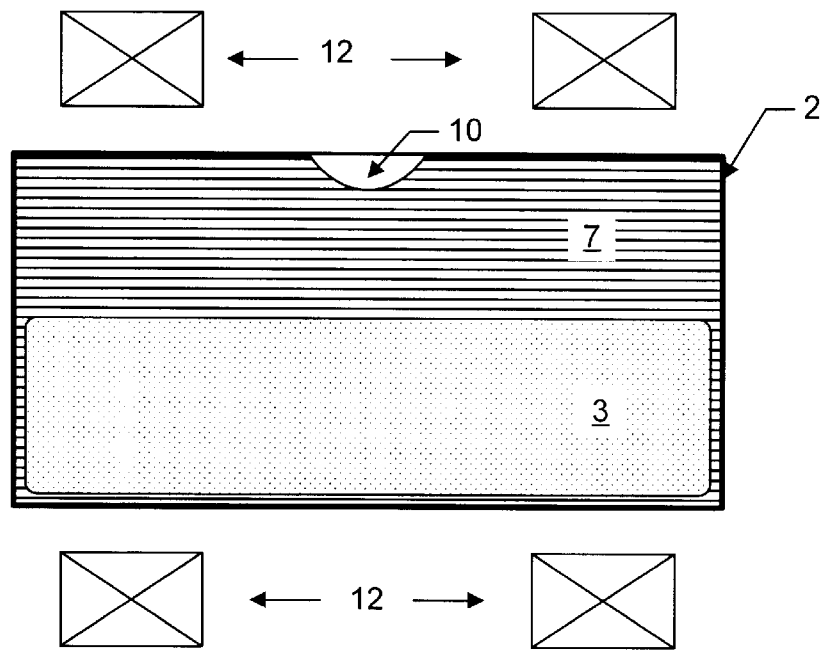
FIG. 7A is schematic diagram of a ferrofluid sensor subassembly having a ferrofluid acting as the sole inductance core material, and two inductance coils.
Figure 7B:
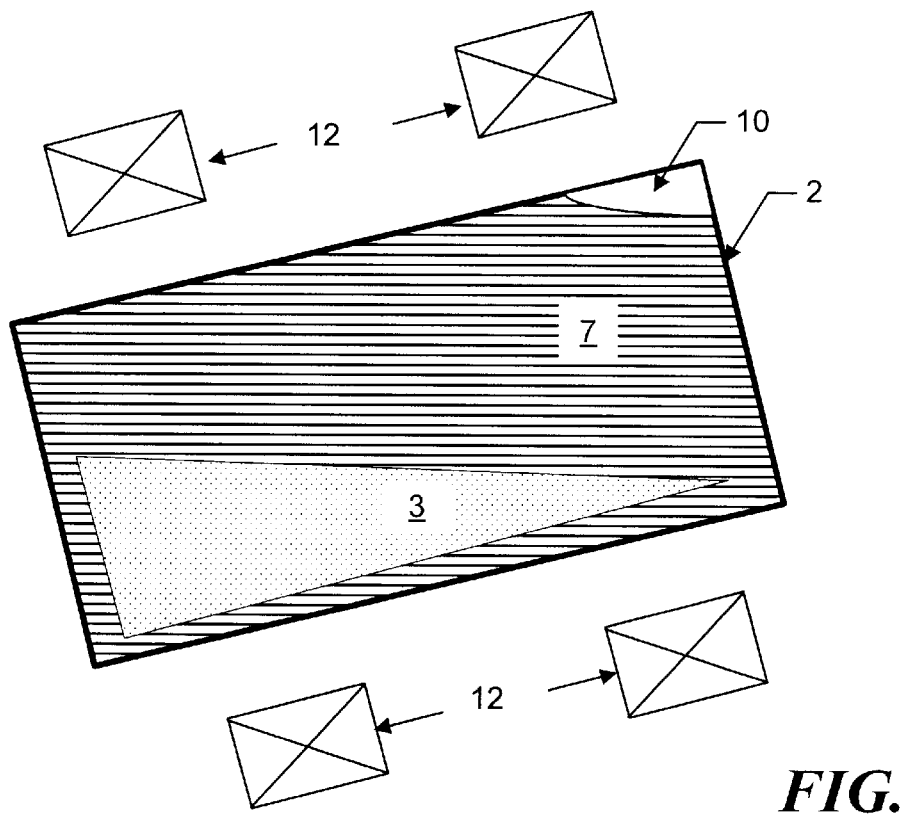
FIG. 7B is a schematic diagram of the ferrofluid sensor subassembly shown in FIG. 7A in a tilted configuration.

FIGS. 6, 7A, and 7B show another embodiment of the invention in which the inductance core material 3 is a ferrofluid. No magnet is included in this embodiment. The sensor includes a ferrofluid 3 preferably having a volume of about half that of the housing 2. During manufacture, the interior walls of the housing 2 are coated with a thin layer of the isolating material 7 before the ferrofluid 3 is added. The ferrofluid 3 then is added to the interior of the housing 2 (after the walls are coated), thus isolating the ferrofluid 3 from the interior walls of the housing 2. Since the ferrofluid 3 is immiscible with and heavier (i.e., denser) than the isolating material 7, it should sink substantially to the bottom of the housing 2. The ferrofluid 3 nevertheless does not contact the interior walls of the housing 2 because it cannot penetrate through the layer of isolating material 7 on the interior walls. To be most effective, the layer should have a thickness of at least one molecule of the isolating material 7. Accordingly, there should be no residual film of ferrofluid 3 on the interior walls of the housing 2 as the ferrofluid 3 moves within the housing 2.

FIG. 6 shows a first type of sensor employing such alternative embodiment, in which the housing 2 contains the ferrofluid 3, the isolating material 7, and a small air bubble 10 to allow for expansion of the ferrofluid 3 and the material 7. Such sensor also includes the single detecting coil 8 for detecting movement of the ferrofluid 3 within the housing 2. FIGS. 7A and 7B show a second type of sensor employing the alternative embodiment, in which the detector includes two coils 12 and thus, is specifically adapted to detect tilt. Accordingly, the inductance of the coil(s) 8 and 12 changes as the ferrofluid 3 moves within the housing 2 of the sensor shown in FIGS. 6, 7A, and 7B. This change may be detected by conventional electronic sensing devices.

While the invention has been shown and described above with respect to various preferred embodiments, it will apparent that the foregoing and other changes of the form and detail may be made therein by one skilled in the art without departing from the spirit and scope of the invention. These and other obvious modifications are intended to be covered by the following claims.

What is claimed is:

1. A ferrofluid sensor comprising:
   a closed housing having inner walls,
   an isolating material coating the inner walls of the housing;
   a movable ferrofluid within the housing, the isolating material forming a layer between the ferrofluid and the inner walls and preventing the ferrofluid from wetting the inner walls; and
   a detector for detecting a position of the ferrofluid within the housing.

2. The ferrofluid sensor as defined by claim 1 wherein the isolating material is immiscible with the ferrofluid.

3. The ferrofluid sensor as defined by claim 1 wherein the isolating material comprises a continuous layer on the inner walls, the layer having a minimum thickness of a single molecule of the isolating material.

4. The ferrofluid sensor as defined by claim 1 wherein the ferrofluid has a density and comprises magnetic particles suspended in a carrier liquid and wherein the isolating material has a density less than the density of the carrier liquid.

5. The ferrofluid sensor as defined by claim 1 wherein the detector includes at least one inductive coil surrounding the housing.

6. The ferrofluid sensor as defined by claim 1 wherein the housing has a circular cross-section.

7. The ferrofluid as defined by claim 1 wherein the isolating material is a liquid that is non-magnetic.

8. The ferrofluid sensor as defined by claim 1 wherein the housing is hermetically sealed.

9. A ferrofluid sensor comprising:
   a housing having inner walls;
   an isolating material coating the inner walls of the housing;
   a ferrofluid mass within the housing, the isolating material forming a layer between the ferrofluid mass and the inner walls of the housing and preventing ferrofluid in the ferrofluid mass from wetting the inner walls; and
   a detector for detecting the position of the ferrofluid mass within the housing.

10. The ferrofluid sensor as defined by claim 9 wherein the housing has a circular cross-section.

11. The ferrofluid sensor as defined by claim 9 wherein the layer is continuous and has a minimum thickness of a single molecule of the isolating material.

12. The ferrofluid sensor as defined by claim 9 wherein the isolating material is immiscible with the inductance core material.

* * * * *